United States Patent [19]

Nitta et al.

[11] 4,219,862

[45] Aug. 26, 1980

[54] LIGHTNING ARRESTER DEVICE

[75] Inventors: Tohei Nitta; Yoshikazu Shibuya; Yukio Fuziwara, all of Amagasaki, Japan

[73] Assignee: Mitsubishi Denki Kabushiki Kaisha, Tokyo, Japan

[21] Appl. No.: 916,053

[22] Filed: Jun. 16, 1978

[30] Foreign Application Priority Data

| | | | |
|---|---|---|---|
| Jun. 22, 1977 | [JP] | Japan | 52/74694 |
| Sep. 30, 1977 | [JP] | Japan | 52/118154 |
| Oct. 24, 1977 | [JP] | Japan | 52/127874 |

[51] Int. Cl.$^2$ .......... H02H 3/22

[52] U.S. Cl. .......... 361/120; 361/127

[58] Field of Search .......... 361/120, 127, 126, 128, 361/129, 130, 117; 315/36; 338/21, 20

[56] References Cited

U.S. PATENT DOCUMENTS

| | | | |
|---|---|---|---|
| 3,649,875 | 3/1972 | Nagai et al. | 361/130 |
| 3,727,108 | 4/1973 | Westrom | 361/127 |
| 3,753,045 | 8/1973 | Osmundsen et al. | 361/120 |
| 3,767,973 | 10/1973 | Osmundsen et al. | 361/120 |
| 3,806,765 | 4/1974 | Matsuoka et al. | 361/128 |
| 3,842,318 | 10/1974 | Nitta | 361/120 |

OTHER PUBLICATIONS

"Gapless Arrester Shows Promise," Electrical World, Dec. 15, 1976, Transmission/Distribution.

*Primary Examiner*—Patrick R. Salce
*Attorney, Agent, or Firm*—Robert E. Burns; Emmanuel J. Lobato; Bruce L. Adams

[57] ABSTRACT

A stack of nonlinear resistors of sintered zinc oxide superposing one another is connected across a bottom of a grounded cylindrical housing and a high voltage conductor insulatingly supported by the housing. Within the housing a shielding conductor slantingly hangs from the connection of the stack and conductor. Alternatively, the shielding electrode may extend from the high voltage conductor to run along the longitudinal axis of the housing. A plurality of nonlinear resistors are divided in several stacks and serially interconnected between the shielding conductor and the inside of the housing to be radially outward inclined to the shielding electrode. Such stacks may be disposed close to the free end portion of the shielding electrode.

7 Claims, 21 Drawing Figures

FIG. 6
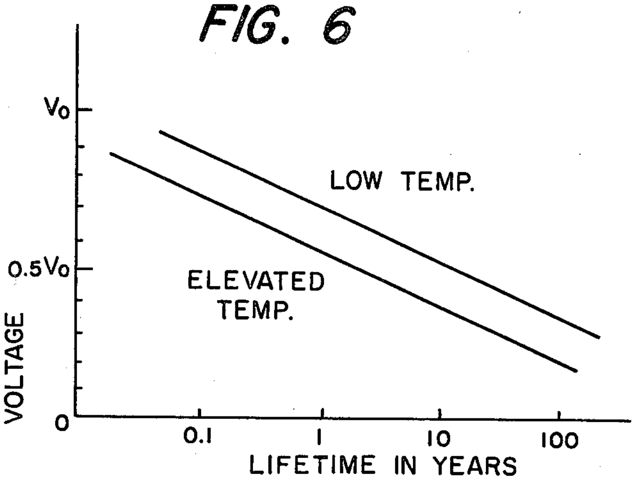
FIG. 7
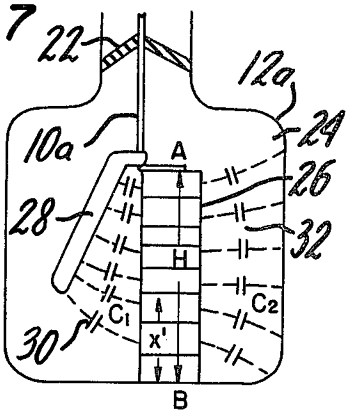
FIG. 8
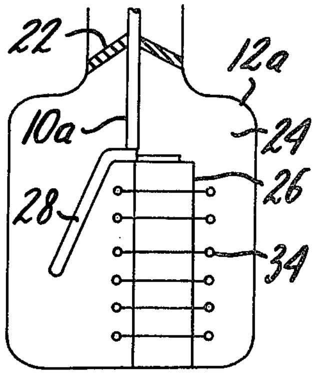
FIG. 9
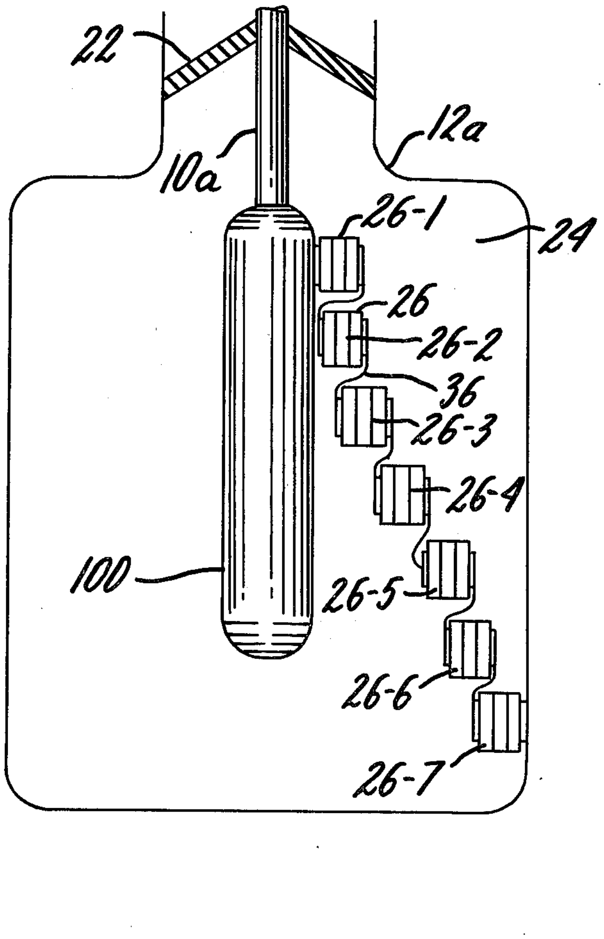
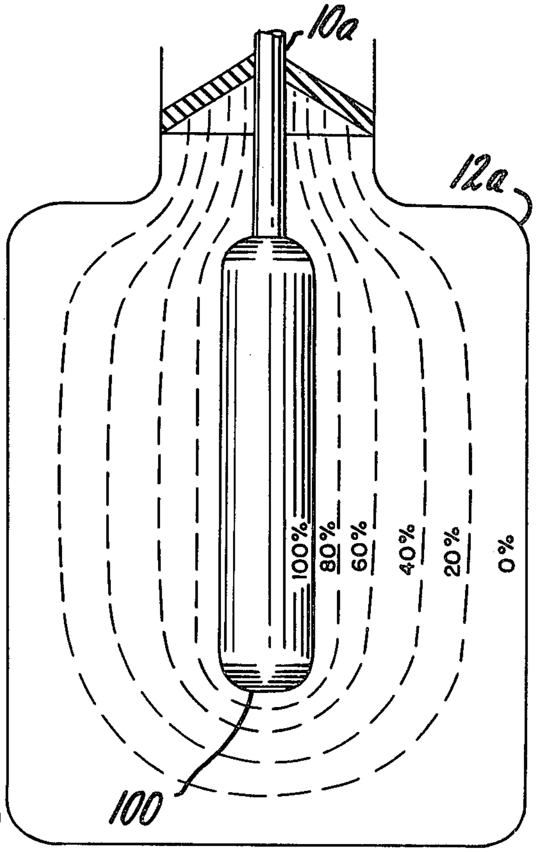
FIG. 10

LIGHTNING ARRESTER DEVICE

BACKGROUND OF THE INVENTION

This invention relates to an enclosed gap-less lightning arrester device utilizing resistors having the excellent nonlinear characteristic, and more paticularly to an arrangement of such resistors improving a potential profile thereon.

The lightning arrester device utilized in miniature substations or the like established in narrow sites is required to be small-sized and is usually of the gas insulating type employing an electrically insulating gas such as sulfur hexafluoride ($SF_6$). Conventional lightning arrester devices of the type referred to have comprised the grounded housing filled with sulfur hexafluoride, and a plurality of nonlinear characteristic elements of silicon carbide (SiC) alternating series discharge gaps within the housing and serially connected to the latter across an associated bus bar and the grounded housing. Also there are known lightning arrester devices of the type referred to employing sintered zinc oxide as the nonlinear characteristic element with the series discharge gaps omitted. In either case, the number of the nonlinear characteristic elements has been determined by an associated bus voltage. As a result, an increase in bus voltage has resulted in the necessity of increasing the dimension of the nonlinear characteristic elements and accordingly rendering the grounded housing large-sized, which is disadvantageous.

In addition, those lightning arrester devices have included the relatively narrow spacing between the grounded housing and a high voltage member disposed within the housing. However, when a high voltage such as a line-to-ground voltage is applied to the device through an equipment adjacent to such a grounded surface, the resulting electric field is adversely affected to form an uneven potential profile on the serially connected nonlinear characteristic elements. This uneven potential profile has thermally affected the performance of the lightning arrester devices.

It is an object of the present invention to provide a new and improved lightning arrester device including nonlinear characteristic elements formed of an electrically resisting material having the excellent nonlinear characteristic and small-sized to be suitable for use in a miniature substation or the like.

It is another object of the present invention to provide a new and improved enclosed lightning arrester device having a potential profile on an assembly of serially connected nonlinear resistors as uniform as possible.

SUMMARY OF THE INVENTION

The present invention provides a lightning arrester device comprising a grounded housing, an electric conductor disposed in electrically insulating relationship within the grounded housing, a plurality of nonlinear resistors disposed within the grounded housing and interconnected in series circuit relationship across the electric conductor and an internal wall of the grounded housing, and means for extending the electric conductor from one side of the plurality of serially connected nonlinear resistors put at a high voltage to come close to the nonlinear resistors.

In a preferred embodiment of the present invention, an assembly formed of a plurality of serially connected nonlinear resistors may be divided into a plurality of subassemblies each formed of a plurality of nonlinear resistors serially interconnected, the plurality of subassembly being disposed following a potential profile established between the electric conductor and the grounded housing.

The plurality of nonlinear resistor subassemblies may be advantageously disposed adjacent to the electric conductor at its extremity to increase an electrostatic capacity developed between each of the nonlinear resistor subassemblies and the electric conductor.

BRIEF DESCRIPTION OF THE DRAWINGS

The present invention will become more readily apparent from the following detailed description taken in conjunction with the accompanying drawings in which:

FIG. 6 is graph illustrating typically voltage-to-lifetime curves for sintered zinc oxide used as a nonlinear characteristic element;

FIG. 7 is a schematic elevational view of an internal construction of one embodiment according to the enclosed lightning arrester device of the present invention;

FIG. 8 is a view similar to FIG. 7 but illustrating a modification of the present invention;

FIG. 9 is a view similar to FIG. 7 but illustrating another modification of the present invention;

FIG. 10 is a graphic representation of equipotential surfaces developed in the interior of the arrangement shown in FIG. 9 in the absence of the nonlinear resistor assembly shown in FIG. 9;

Throughout the FIGURES like reference numerals designate the identical or similar components.

DESCRIPTION OF THE PREFERRED EMBODIMENTS

Figure 1:
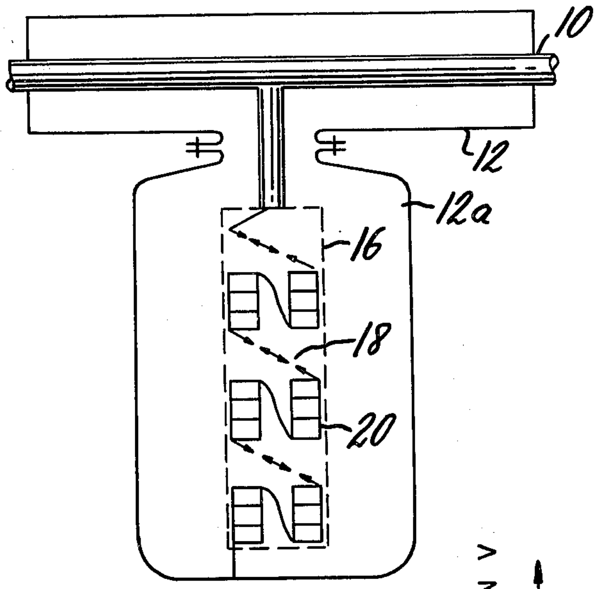
FIG. 1 PRIOR ART
FIG. 1 is a schematic elevational view of an internal construction of a grounded housing type lightning arrester of the conventional design utilizing silicon carbide (SiC) as nonlinear characteristic elements formed for use in a miniature substation.

Referring now to FIG. 1 of the drawings, there is schematically illustrated a grounded housing type lightning arrester device of the conventional construction for use in a miniature substation or the like. The arrangement illustrated comprises a bus bar 10 forming a central conductor of an electric system, and a grounded container 12 of circular cross section encircling coaxially in electrically insulating relationship the bus bar 10 to form therebetween an annular electrically insulating space 14 filled with an electrically insulating gas consisting of sulfur hexafluoride ($SF_6$). Also the grounded container 12 along with the bus bar 10 forms an electric path filled with the sulfur hexafluoride. At a point on the electric path the grounded container 12 is hermetically connected to a grounded circular housing 12*a* also filled with the sulfur hexafluoride. Within the grounded housing 12*a* an arrester element generally designated by the reference numeral 16 is disposed to be electrically connected across the bus bar 10 and the grounded housing 12*a*. The arrester element 16 includes a plurality of discharge gaps 16 alternating nonlinear characteristic elements 20 and interconnected in series circuit relationship with the latter. The nonlinear characteristic element 18 includes a plurality of nonlinear resistors composed of silicon carbide (SiC).

In FIG. 1 the arrester element 16 is shown as including a first one of the discharge gaps 16 and the last one of the nonlinear characteristic elements 20. The number of the series combinations 18–20 is determined by a voltage on the bus bar 10 or a voltage of the particular electric system. As a result, an increase in system voltage has caused the arrester element 16 to increase in dimension leading to the necessity of rendering the grounded housing large-sized. This has resulted in the disadvantage that the housing is difficult to be small-sized.

In addition, lightning arrester devices such as shown in FIG. 1 have included the relatively narrow spacing between the grounded housing and the high voltage member disposed within the housing. However, when a high voltage such as a line-to-grounded voltage is applied to the device through an equipment adjacent to such a grounded surface, the resulting electric field is adversely affected to form an uneven potential profile on the serially connected nonlinear characteristic elements. This uneven potential profile has thermally affected the performance of the lightning arrester device.

Lately, nonlinear characteristic elements formed of the zinc oxide (ZnO) system have been developed and tend to be substituted for nonlinear characteristic elements made of silicon carbide. Such elements formed of the zinc oxide system have the ability to interrupt the power follow current and eliminate the necessity of disposing a discharge gap between each pair of adjacent nonlinear characteristic elements.

Figure 2:
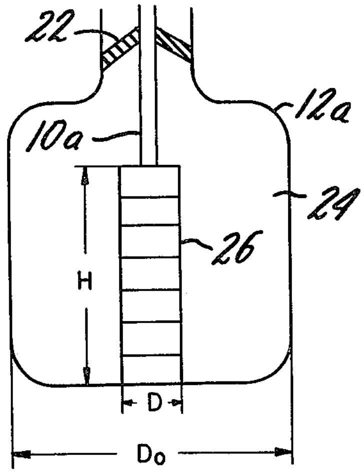
FIG. 2 PRIOR ART
FIG. 2 is a view similar to FIG. 1 but illustrating another conventional lightning arrester device utilizing sintered zinc oxide (ZnO) as nonlinear characteristic elements.

FIG. 2 shows another grounded housing type lightning arrester device of the conventional construction including nonlinear characteristic elements formed of zinc oxide. In the arrangement illustrated a high voltage conductor 10*a* branched from a bus bar (not shown) is extended and sealed through an electrically insulating spacer 22 hermetically closing a reduced diameter opening of a grounded housing 12*a* that has an internal space 24 filled with an electrically insulating gas high in dielectric strength, for example, sulfur hexafluoride. In the internal space 24 a stack of disc-shaped nonlinear resistors 26 serially interconnected is connected at one end to the free end of the conductor 10*a* and at the other end to the internal bottom surface of the grounded housing 12*a*. The resistor 26 is formed of sintered zinc oxide and excellent in nonlinear characteristic. The present invention has an interest in the arrangement of FIG. 2.

The operation of the arrangement shown in FIG. 2 will now be described. The conductor 10*a* is connected to a high voltage terminal of an electric apparatus to be protected although the electric apparatus is not illustrated only for purposes of illustration. Incoming surges resulting from lightning strokes or other disturbarbances are shortcircuited to ground through the conductor 10*a* and the stack of nonlinear resistors 26.

Figure 3:
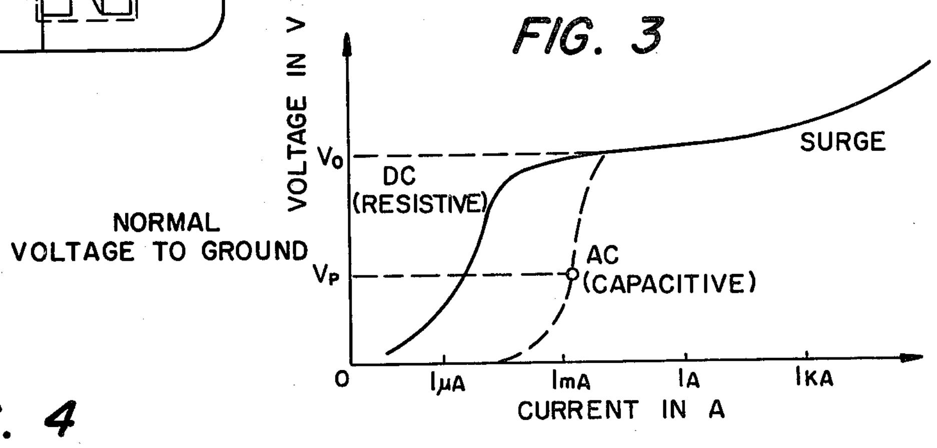
FIG. 3 is a graph illustrating the current-to-voltage characteristic of sintered zinc oxide used as a nonlinear characteristic element.

Sintered zinc oxide employed as the nonlinear resistors 26 have typically the voltage-to-current characteristic as shown in FIG. 3. In FIG. 3 the axis of abscissas represents a current in amperes in a logarithmic unit and the axis of ordinates represents a voltage in volts. Solid curve describes the characteristic for direct current or high current surges and indicates that a voltage across the nonlinear resistor is maintained substantially constant over a wide range of currents. Therefore, a rise in voltage across the arrangement of FIG. 2 can be suppressed to a low magnitude.

On the other hand, when an AC voltage is applied across the arrangement of FIG. 2, the resulting voltage-to-current characteristic in a low current region is shown at broken line in FIG. 3 and different from that for direct current. Broken line plots the peak value of the AC voltage against that of an alternating current. This difference between both characteristics results from the nonlinear resistor of the sintered zinc oxide having an electrostatic capacity and is seen with various nonlinear resistors composed of the sintered zinc oxide. However, with high AC voltages in excess of a certain magnitude, the voltage-to-current characteristic for AC becomes identical to that for direct current.

From FIG. 3 it is seen that, when the voltage exceeds a magnitude $V_o$, the AC characteristic approximately coincides with the DC characteristic while both characteristics are different from each other with voltages lower than the magnitude $V_o$. For sintered zinc oxide resistors, the magnitude of current corresponding to the voltage $V_o$ is normally equal to or higher than 1 milliampere. However, AC arresters include the stack of nonlinear resistors having always applied thereacross an AC line voltage called a "normal voltage to ground". That normal voltage to ground is selected to be lower than the voltage $V_o$, for example, at a level designated by $V_p$ shown in FIG. 3 in view of the relationship between the lifetime of sintered zinc oxide resistors and the voltage applied thereacross as will be described hereinafter.

As the sintered zinc oxide resistor functions as a substantially perfect capacitor with respect to such low AC voltages, the following problems arise.

In the arrangement of FIG. 2, stray capacitances are developed between the nonlinear resistors 26 and the housing 10*a*. By taking account of those stray capacitances, it is required to discuss how a low AC voltage such as the normal voltage to ground applied across the resistor stack is divided among the nonlinear resistors on the basis of an equivalent circuit to the arrangement of FIG. 1 such as shown in FIG. 4.

Figure 4:
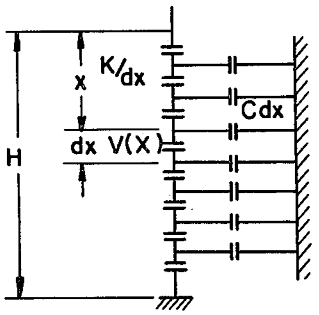
FIG. 4 is a diagram of an equivalent circuit to the arrangement shown in FIG. 2.

In FIG. 4, H designates the total length of the stack of nonlinear resistors 26 (see also FIG. 2), x a distance of a point to be considered measured from the high voltage end of the stack, dx a differential of the distance x required for effecting the undermentioned differential calculation, K/dx an electrostatic capacity of a portion of the stack having a length dx, and Cdx designates an electrostatic capacity developed between the portion of the stack having the length dx and the grounded housing 10. Further a voltage V is applied across the stack of nonlinear resistors 26 and v(x) designates a potential at the point x. Then the relationship $$v(x)Cdx = \frac{d}{dx}\left[\frac{dv(x)}{dx}\cdot dx\cdot\frac{K}{dx}\right]dx$$

holds. Assuming that the C and K are independent upon the x and therefore constant, the above relationship is reduced to $$\frac{d^2v(x)}{dx^2} = \frac{C}{K}v(x).$$

Assuming that the boundary conditions V(o)=V and v(H)=O hold, the solution of the above differential equation results in $$v(x) = V\frac{\sinh\left[\sqrt{\frac{C}{K}}\,(H-x)\right]}{\sinh\left[\sqrt{\frac{C}{K}}\,H\right]}.$$

Figure 5A:
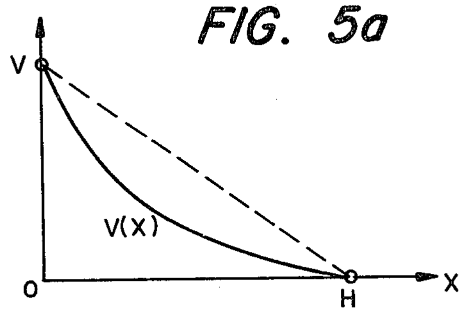
FIGS. 5*a* and 5*b* are graphs illustrating respectively a electric potential profile and an electric field profile on a nonlinear resistor assembly disposed in the arrangement shown in FIG. 2 due to an AC voltage always applied thereacross.

A potential profile on the stack of nonlinear resistors expressed by the above expression is shown at solid line in FIG. 5*a* wherein the axis of the abscissas represents the distance x and the axis of ordinates represents a potential. If the stack of nonlinear resistors is replaced by a fixed resistor, then the resulting potential profile is rectilinear as shown at broken line in FIG. 5*a*.

From the above expression for v(x) and therefore FIG. 5*a* it is seen that the potential profile as shown at solid line is different from the rectilinear potential profile as shown at broken line and that its deviation from the rectilinear potential profile is increased as the total length H of the resistor stack becomes long.

Figure 5B:
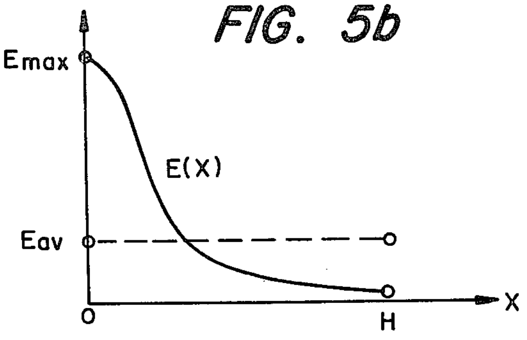

As a result, an electric field E(x) established within the stack of nonlinear resistors and defined by $E(x)=|dv(x)/dx|$ is much non-uniform as shown at solid curve in FIG. 5*b* wherein the E(x) is plotted in ordinate against the distance x in abscissa. As shown in FIG. 5*b*, a maximum magnitude $E_{max}$ of the electric field appears on the high voltage side of the nonlinear resistor stack corresponding to $x=0$ and is extremely high as compared with the average magnitude $E_{av}$ (see FIG. 5*b*). Under these circumstances, that portion of the nonlinear resistor stack near to the high voltage side is in its overvoltage state in which an overvoltage is very higher than the normal voltage $V_p$ to ground. If such an overvoltage is always applied to the nonlinear resistor stack such as sintered zinc oxide resistors then the resistors are generally electrically deteriorated because the resistors generate unevenly heat and are unevenly deteriorated. FIG. 6 shows one example of the voltage-to-lifetime curve for sintered zinc oxide resistors. In FIG. 6 a voltage is plotted in ordinate against a lifetime in abscissa in years in a logarithmic unit. Upper curve as viewed in FIG. 5 describes a zinc oxide resistor put at a low temperature while lower curve describes the resistor put an elevated temperature. As shown in FIG. 6, the lifetime is rapidly decreased as the voltage approaches the magnitude $V_o$ (see FIG. 3).

From the foregoing it will be appreciated that in the conventional construction of lightning arrester devices, the normal voltage to ground has been biased toward the high voltage side of the nonlinear resistor stack resulting in the disadvantage that portion of the nonlinear resistor stack near to the high voltage side is rapidly deteriorated.

The present invention contemplates to eliminate the abovementioned disadvantages of the prior art practice and more particularly of the arrangement shown in FIG. 2.

Referring now to FIG. 7, there is illustrated one embodiment according to the lightning arrester device of the present invention. The arrangement illustrated is different from that shown in FIG. 2 only in that in FIG. 7 an electric conductor 28 in the form of rod extending downward from the high voltage side A of the stack of nonlinear resistors 26 to spread radially outward from the stack. In FIG. 7 the electric conductor 28 is shown as slantingly extending from the high voltage conductor 10*a* in the form of an L adjacent to a bent of the "L" and the nonlinear resistor stack 26 is shown as being eccentrically disposed within the circular housing 12*a*, so that the longitudinal axis of the housing 12*a* runs on the peripheral surface thereof. That is, the nonlinear resistor stack 26 is connected on the high voltage side A to the shorter leg of the "L" so as to align substantially the peripheral surface thereof with the longer leg of the "L". The stack 26 includes the other side B disposed on and connected to the bottom of the housing 12*a*. However the stack 26 may be disposed coaxially with the housing 12*a*.

As shown in FIG. 7 an electrostatic capacity 30 (which is a stray capacity) is developed between the electric conductor 28 and the nonlinear resistor stack 26 while an electrostatic capacity 32 (which is similarly a stray capacity) is developed between the stack 26 and the grounded housing 12*a*.

The operation of the arrangement shown in FIG. 7 will now be described. As in the arrangements shown in FIGS. 1 and 2, the stack of nonlinear resistors 26 presents an extremely low resistance before any surge resulting from a lightning stroke or the like whereby the device is prevented from rising in voltage thereacross. On the other hand, the stack of nonlinear resistors 26 responds to a voltage always applied thereacross to cause only a minute current to flow therethrough. In power lightning arrester devices always applied with the commercial frequency AC voltage, the abovementioned minute current is determined by the electrostatic capacities of the resistor stack as will readily be understood from the description made in conjunction with FIG. 4.

In the arrangement of FIG. 7 the presence of the electrostatic capacity 30 causes a potential profile on the stack of nonlinear resistors resulting from an AC voltage always applied thereacross to approach a rectilinear profile rather than the potential shown at solid line in FIG. 5*a*. The ideal potential profile is rectilinear as shown at broken line in FIG. 5*a*. This rectilinear potential profile can be realized when the following relationship $$\frac{C_1}{C_1 + C_2} = \frac{x'}{H}$$

is fulfilled where H designates a height or the total length $\overline{AB}$ of the nonlinear resistors 26 as shown in FIG. 7, and $C_1$ and $C_2$ designate electrostatic capacities developed between that nonlinear resistor located at its height x' measured from the grounded side B of the stack (see FIG. 7) and the rod-shaped conductor 28 (which functions as the shielding conductor) and between the same nonlinear resistor at its height x' and the grounded housing **12*a*** respectively. The above relationship must be fulfilled by all the nonlinear resistors serially interconnected. It is, however, to be noted that an accuracy with which the abovementioned relationship be fulfilled may be not necessarily severe and that an error exists, of course, within a predetermined tolerance.

In order to improve the potential profile on electric equipments operated at high voltages in the air, the shielding ring with a rotation symmetric structure has been previously employed. If a shield with such a structure as left intact is applied to that for the nonlinear resistor as above described, then the abovementioned relationship can not hold with all the nonlinear resistors because the electrostatic capacity $C_2$ becomes approximately null over a wide range in the vicinity of this shield. The relationship as above described is rather easy to be fulfilled by the unsymmetric disposal of the resistor stack such as shown in FIG. 7. This unsymmetric disposal is advantageous in that the grounded housing is prevented from increasing in diameter in view of the standpoint of the electrically insulating distance.

While the present invention has been described in conjunction with a single shielding rod pendent radially outward from the high voltage side of the nonlinear resistor stack, the satisfactory result is also given by a plurality of shielding rods pendent radially outward from the high voltage side of the stack. This measure is complicatedly concerned with the electrostatic capacities of the nonlinear resistor stack, the shape of the grounded housing etc..

The arrangement illustrated in FIG. 8 is substantially identical to that shown in FIG. 7 excepting that an electrode extends from the interface between each pair of adjacent nonlinear resistors to form an annular shield 34. The annular shields 34 serve to equalize an electric field on the peripheral surface of the nonlinear resistor stack 26.

In the arrangements shown in FIGS. 7 and 8, the nonlinear resistors 26 are disposed to be aligned with one another longitudinally of the grounded housing **12*a* while the shielding conductor 28 is pendent from the stack of nonlinear resistors 26 thus aligned on the high voltage side to slant radially outward thereby to compensate for the electrostatic capacity developed the grounded housing 12*a* and the stack 26. However it will readily be understood that the shielding conductor 28 may be disposed on the longitudinal axis of the grounded housing 12*a* while the nonlinear resistors 26 are disposed between the shielding conductor 28 and the grounded housing 12*a*** so as to follow a potential profile established therebetween. Of course, this is within the scope of the present invention.

The latter case is shown in FIG. 9. In the arrangement illustrated a cylindrical shielding conductor 100 is larger in diameter than the high voltage conductor **10*a* and extended from latter along the longitudinal axis of the grounded housing 12*a* therein. An assembly of nonlinear resistors generally designated by the reference numeral 26 is divided into a plurality of subassemblies 26-1, 26-2, 26-3, 26-4, 26-5, 26-6 and 26-7 interconnected in series circuit relationship across the peripheral surface of the shielding conductor 100 on that portion near to the conductor 10*a* and the grounded housing 12*a*** on that portion adjacent to the bottom thereof.

The nonlinear resistor subassemblies 26-1 through 26-7 are identical to one another and each of them is shown in FIG. 9 as including three nonlinear resistors superposing one another and a pair of electrodes disposed on both ends thereof. More specifically, the subelements 26-1, 26-2, 26-3, 26-4, 26-5, 26-6 and 26-7 are serially interconnected in the named order through respective leads 36 and located at their positions nearer to the shielding conductor 100 as their potentials are higher and also at their positions nearer to the inner peripheral surface of the housing **12*a* as their potential is lower. For example, the sub-element 26-1 is at highest potential and connected on one end face to the shielding conductor 100 through an associated electrode while the sub-element 26-7 is at the lowest potential and connected to the grounded housing 12*a* through its electrode. The sub-element 26-4 is at an intermediate potential and lies midway between the shielding conductor 100 and the grounded housing 12*a*. Each nonlinear resistor includes opposite flat faces parallel to the longitudinal axis of the housing 12*a***.

As in the arrangements as above described, the nonlinear resistor assembly 26 presents a very low resistance before any surge due to a lightning stroke or the like to be prevented from increasing in voltage thereacross. At that time, the voltage applied across the assembly 26 is substantially equally divided among the resistor subassemblies 26-1 through 26-7. In the contrary, an AC voltage always applied across the resistor assembly 26 is divided among the subassemblies 26-1 through 26-7 as determined by both the electrostatic capacity of the resistor assembly 26 and a stray capacity developed between the shielding conductor 100 on the high voltage side and the housing **12*a* on the ground side, as above described in conjunction with FIG. 7. That is, the AC voltage is unequally divided among the resistor subassemblies 26-1 through 26-7**.

Under these circumstances, positions occupied by the nonlinear resistor subassemblies 26-1 through 26-7 can be adjusted so that potentials at the respective subassemblies 26-1 through 26-7 substantially coincide with those within an electrostatic field established between the shielding cylindrical conductor 100 and the grounded housing **12*a* in the absence of the nonlinear resistor assembly 26. FIG. 10 illustrates percentage equipotential lines within such an electric field by broken lines. This adjustment prevents the AC voltage always applied across the nonlinear resistor assembly 26 from being unequally divided among the subassemblies 26-1 through 26-7 due to the presence of the stray capacities. In other words, the resulting potential profile on the resistor assembly 26 can approach the typical one as shown at broken line in FIG. 5*a* from the potential profile as shown at solid line in the same FIG. 5***a*. Also, the resulting field profile approaches the typical one as shown at broken line in FIG. 5*b* rather than the profile as shown at solid line in FIG. 5*b*.

While in the arrangement of FIG. 9 the nonlinear resistor subassemblies 26-1 through 26-7 are disposed in one radial plane extending from the longitudinal axis of the housing 12*a* it is to be understood that the subassemblies may be spirally disposed around the cylindrical conductor 100 to be more distant from the latter toward the bottom of the housing 12*a* with the satisfactory result.

Each nonlinear resistor subassembly is shown in FIG. 9 as including three nonlinear resistors but it may include any desired number of the nonlinear resistors.

Figure 11:
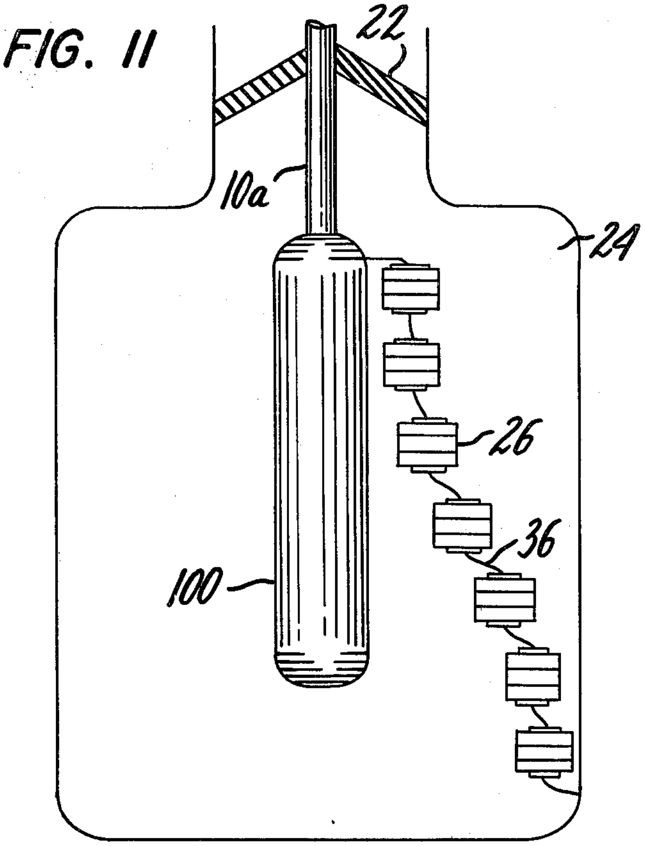
FIG. 11 is a view similar to FIG. 7 but illustrating a modification of the arrangement shown in FIG. 9.

Also the nonlinear resistor subassemblies 26-1 through 26-7 are shown in FIG. 9 as having respective axes orthogonal to the longitudinal axis of the housing 12*a* and therefore of the cylindrical conductor 100. However, those subassemblies may be disposed to have their axes parallel to the longitudinal axis of the housing 12*a* or the cylindrical conductor 100 as shown in FIG. 11.

Figure 12:
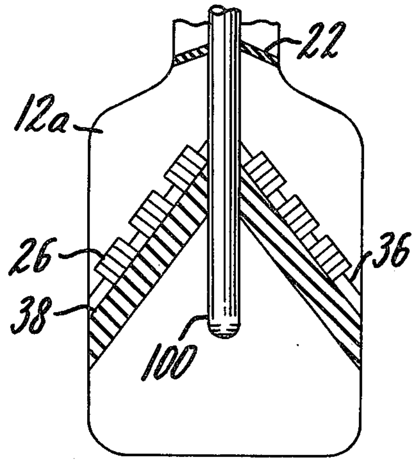
FIG. 12 is a view similar to FIG. 9 but illustrating a supporting mechanism for nonlinear resistors such as shown in FIG. 9.
Figure 13:
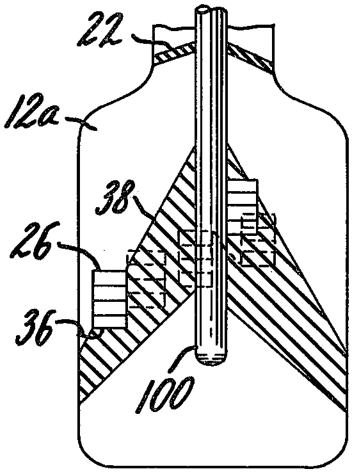
FIG. 13 is a view similar to FIG. 12 but illustrating a modification of the arrangement shown in FIG. 12.

The nonlinear resistor assembly 26 as shown in FIG. 9 and the modification thereof as above described can be supported in place as shown in FIGS. 12 and 13.

In FIG. 12 a conical supporting member 38 formed of an electrically insulating material has an apex through which the cylindrical conductor 100 is extended and sealed and a bottom fixedly secured to the inner lateral surface of the housing 12*a*. Then a pair of nonlinear resistor assemblies 26 are disposed in diametrally opposite relationship on the conical supporting member 38 so that the nonlinear resistor subassemblies of each assembly are located on the supporting member 36 following a potential profile established between the conductor 100 and the grounded housing 12*a*. The nonlinear resistor subassemblies of each assembly thus located on the supporting member 38 are serially interconnected across the high voltage conductor 100 and the grounded housing 12*a*. While FIG. 12 shows a pair of nonlinear resistor assembly connected in parallel circuit relationship in order to increase a discharge current flowing through the device, it is to be understood that a single nonlinear resistor assembly may be disposed on the supporting member as in the arrangement of FIG. 9. Also, in order to increase further the discharge current, more than two assemblies may be disposed at equal angular intervals on the supporting member 38 to be connected in parallel circuit relationship. Further, an additional number of nonlinear resistor assemblies may be secured to the rear surface of the supporting member 36 for the purpose of increasing futhermore the discharge current.

FIG. 13 shows the nonlinear resistor assembly 26 including a plurality of nonlinear resistor subassemblies disposed on the conical supporting member 38 to encircle spirally the cylindrical conductor 100. In other respects the arrangement is substantially identical to that shown in FIG. 12.

Figure 14:
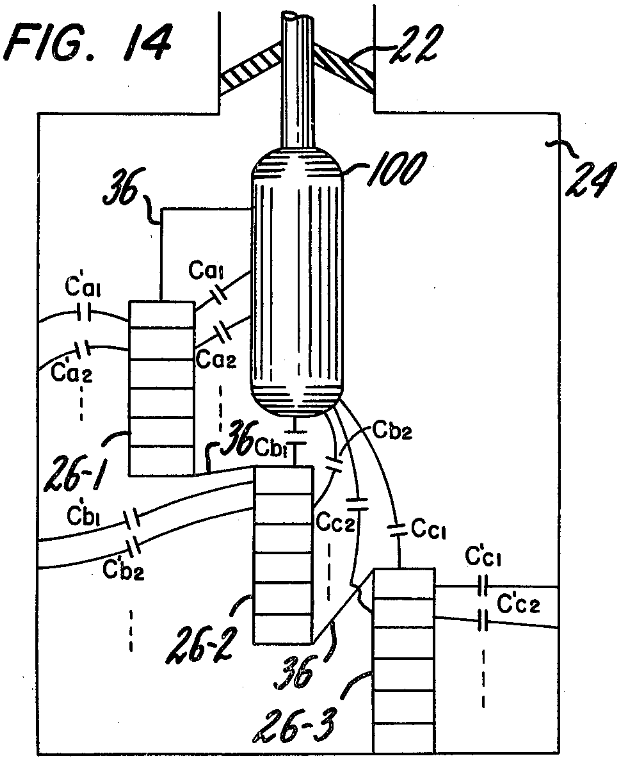
FIG. 14 is a view similar to FIG. 7 but illustrating still another modification of the present invention.

FIG. 14 shows a modification of the arrangement illustrated in FIG. 11. In the arrangement illustrated the nonlinear resistor assembly is divided into three subassemblies 26-1, 26-2 and 26-3 identical to one another and disposed close to the free extremity of the shielding cylindrical conductor 100 and serially interconnected across the shielding cylindrical conductor 100 on the high voltage side and the housing 12*a* on the grounded side through leads 36 for the purpose of increasing an electrostatic capacity between each of the subassemblies and the shielding conductor 100 thereby to form a uniform potential profile on the nonlinear resistor assembly. Thus the nonlinear resistors of the subassembly 26-1 have respective electrostatic capacities $C_{a1}$, $C_{a2}$, . . . developed between the same and the cylindrical conductor 100 and individual electrostatic capacities $C'_{a1}$, $C'_{a2}$, . . . developed between the same and the housing 12*a* starting with the uppermost nonlinear resistor as viewed in FIG. 14. Also the nonlinear resistors of the subassembly 26-2 have electrostatic capacities $C_{b1}$, $C_{b2}$, . . . between the same and the cylindrical conductor 100 and electrostatic capacities $C'_{b1}$, $C'_{b2}$, . . . between the same and the housing 12*a* respectively. Similarly, electrostatic capacities, $C_{c1}$, $C_{c2}$, . . . and electrostatic capasities $C'_{c1}$, $C'_{c2}$, . . . are developed between the nonlinear resistors of the subassembly 26-3 and the conductor 100 and between those resistors and the housing 12*a* respectively.

As in the arrangements shown in the foregoing Figures, the nonlinear resistor subassemblies 26-1, 26-2 and 26-3 presents extremely low resistances before any surge due to a lightning stroke or the like which prevents an increase in voltage across the serially connected subassemblies 26-1, 26-2 and 26-3. Under these circumstances, the subassemblies 26-1, 26-2 and 26-3 are substantially equal in resistance to one another and therefore bear substantially equal voltages respectively although the voltage applied across the series combination of those subassemblies is divided into three parts.

On the other hand, an AC voltage always applied across the series combination of the nonlinear resistor subassemblies 26-1, 26-2 and 26-3 causes only a minute current to flow through the series combination thereof. In power lightning arresters always applied with the AC voltage at a commercial frequency, that minute current is determined by an electrostatic capacity of the nonlinear resistor assembly as above described.

In the arrangement of FIG. 14, the nonlinear resistor assembly is divided into the three subassemblies which are disposed close to the high voltage conductor 100 thereby to increase the electrostatic capacities $C_{a1}$, . . . $C_{b1}$, . . . and $C_{c1}$, . . . developed between the nonlinear resistor subassemblies 26-1, 26-2, 26-3 and the high voltage conductor 100. This increase in electrostatic capacities permits potentials at the nonlinear resistors to approximate the potential at the high voltage conductor 100 as compared with the arrangement shown in FIG. 2 resulting in improvements in a potential profile on the entire resistor assembly.

Figure 15A:
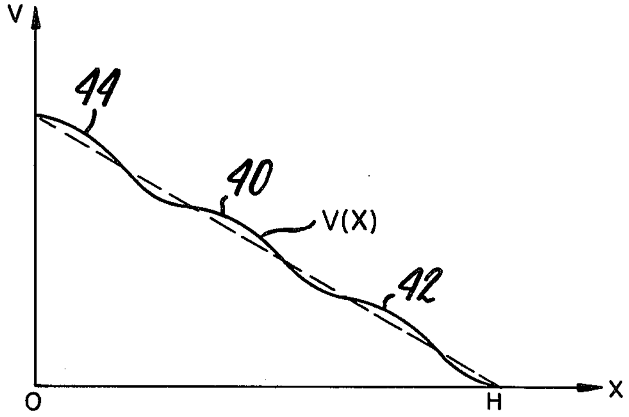
FIGS. 15*a* and 15*b* and graphs similar to FIGS. 5*a* and 5*b* respectively but illustrating the arrangement shown in FIG. 14.
Figure 15B:
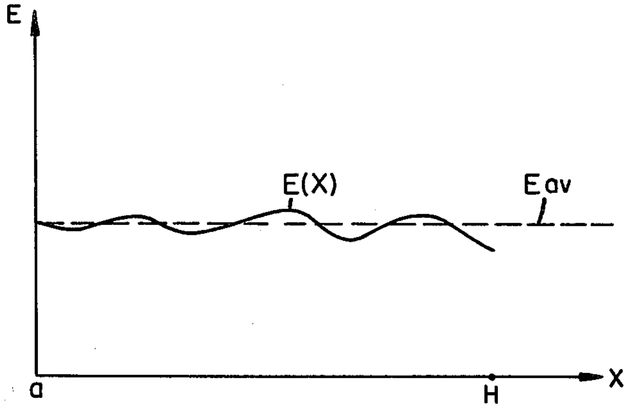

A potential and an electric field were measured along the series combination of the nonlinear resistor subassemblies 26-1, 26-2 and 26-3 shown in FIG. 14. The results of the measurements are illustrated in FIGS. 15*a* and 15*b*. In FIG. 15*a* solid curve labelled v(x) depicts the resulting potential profile on the series combination of the subassemblies plotted against a distance x on the series combination measured from the high voltage end thereof on the assumption that the three subassemblies are physically interconnected without spacings formed among them. Also the resulting electric field profile is shown at solid line labelled E(x) in FIG. 15*b*. In FIGS. 15*a* and 15*b* H designates the total length of the three serially connected subassemblies and broke lines have the same meanings as those shown in FIGS. 5*a* and 5*b*.

From FIG. 15*a* it is seen that the measured potential profile fairly approaches the ideal linear potential profile shown at broken line. Humps 40 and 42 of the potential profile v(x) result from the effect of the electrostatic capacities $C_{b1}, \ldots C_{c1}, \ldots$ which are developed as one of the traits of the arrangement shown in FIG. 14. From this it is seen that those electrostatic capacities are very much effective for causing the entire potential profile to approach the liner one.

Further, as the nonlinear resistor subassembly 26-1 can be disposed relatively close to the high voltage conductor 100 to increase the electrostatic capacities $C_{a1}, C_{a2}, \ldots$ developed therebetween, a potential profile appearing on that subassembly 26-1 can further approach the ideal linear one as shown by a portion of the potential profile v(x) designated by the reference numeral 44 in FIG. 15*a*.

Also from FIG. 15*b* it is seen that the field profile E(x) fairly approximates the average electric field $E_{av}$.

In FIGS. 15*a* and 15*b*, the measured profiles are more or less different from the corresponding ideal profiles but their deviations from the ideal profiles are not always called in question and may be within a predetermined tolerance.

While the present invention has been described in conjunction with the division of the nonlinear resistor assembly into three subassemblies it is to be understood that the number of the subassemblies may exceed three. The larger the number of the subassemblies the more the potential profile on the nonlinear resistor assembly can approach the linear one.

Figure 16:
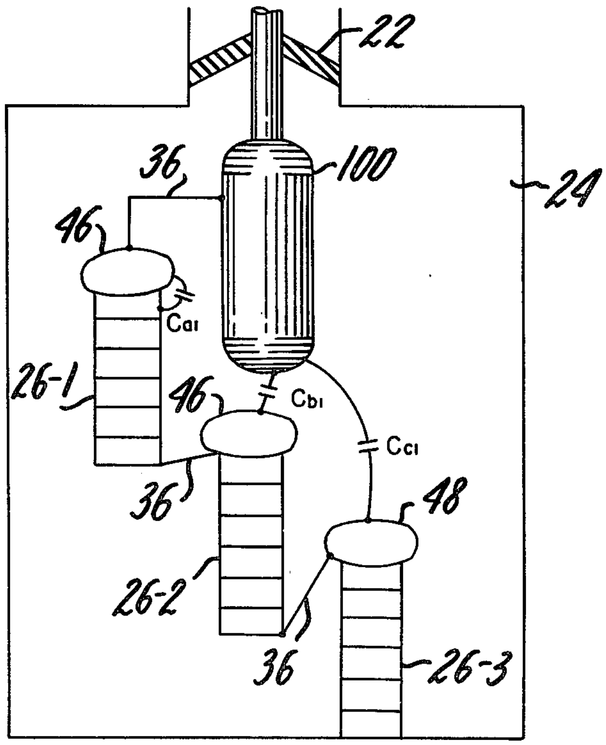
FIG. 16 is a view similar to FIG. 7 but illustrating a modification of the arrangement shown in FIG. 14.

In order to increase further the electrostatic capacities $C_{a1}, \ldots, C_{b1}, \ldots$ and $C_{c1}, \ldots$, a shield 46 having a suitable shape can be secured to the upper face of each subassemblies of nonlinear resistors 26-1, 26-2 or 26-3 as shown in FIG. 16.

Figure 17:
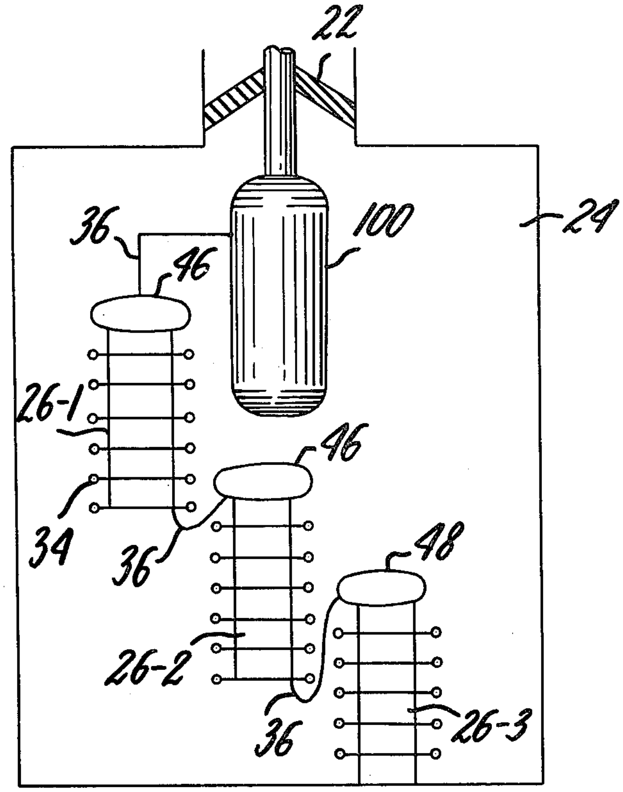
FIG. 17 is a view similar to FIG. 7 but illustrating another modification of the arrangement shown in FIG. 14.

Also the annular shield 34 as above described in conjunction with FIG. 8 can be electrically connected to the interface between each pair of the adjacent nonlinear resistors of each subassembly 26-1, 26-2 or 26-3 as shown in FIG. 17. Those annular shields 34 are effective for equalizing an electric field on the surface of the associated subassembly.

While the present invention has been illustrated and described in conjunction with lightning arrester devices including the grounded housing forming a termination of the high voltage conductor it is to be understood that the same is equally applicable to lightning arrester devices including the grounded housing through which a bus bar extends.

Figure 19:
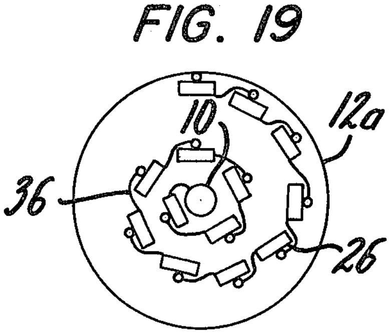
FIG. 19 is a sectional view taken along the line [XX — [XX of FIG. 18.
Figure 18:
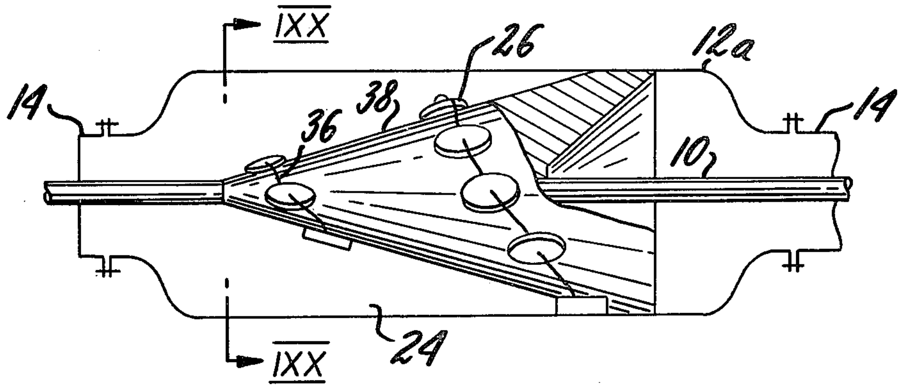
FIG. 18 is a schematic elevational view, partly in a perspective, of a further modification of the present invention with a part broken away.

In FIG. 18 a bus bar 10 extends through a grounded housing 12*a* having both ends open to run along the longitudinal axis thereof. The grounded housing 12*a* is hermetically connected at both ends to the adjacent portions of a grounded container 12 for the bus bar 10. The bus bar 10 is extended and sealed through the apex of the conical supporting member 36 as above described in conjunction with FIGS. 12 and 13 to be held in place within a electrically insulating space 24 filled with an electrically insulating gas such as sulfur hexafluoride. As best shown in FIG. 19, a plurality of nonlinear resistors 26 are disposed on the conical supporting member 38 and serially interconnected across the bus bar 10 and the grounded housing 12*a*.

The arrangement shown in FIGS. 18 and 19 is advantageous in that, with the system voltage high enough to require a multiplicity of the nonlinear resistors serially interconnected, they can be accommodated in the grounded housing 12*a* having a sharply decreased diameter as compared with the prior art practice. The nonlinear resistor subassembly as above described may be substituted for each of the nonlinear resistors 26 shown in FIGS. 18 and 19. Therefore a small-sized lightning arrester device can be produced.

From the foregoing it is seen that the present invention provides a lightning arrester device having always applied thereacross an AC voltage that is equally divided among a plurality of nonlinear resistors involved with a simple construction resulting in both a long lifetime and high reliability while rendering the device smalled-sized by disposing the nonlinear resistors within an electrically insulating space defined by a grounded housing for the device.

While the present invention has been illustrated and described in conjunction with several preferred embodiments thereof it is to be understood that numerous changes and modifications may be resorted to without departing from the spirit and scope of the present invention. For example, the high voltage conductor is not restricted to the form of a circular rod and may be in the form of a flat plate having any suitable shape.

What we claim is:

1. An encapsulated lightening arrester, comprising: a hollow cylindrical electrically conductive housing; an electric conductor extending into said hollow cylindrical housing and insulated from said hollow cylindrical housing; a plurality of stacked serially connected nonlinear resistors stacked in at least one stack within said hollow cylindrical housing, said stack of said serially connected nonlinear resistors having one end connected to said electric conductor and having another end connected to said hollow cylindrical housing for defining an electrically resistive path between said electric conductor and said housing; at least one shielding conductor within said housing and extending along a side of said stack of nonlinear resistors; and wherein said stack of nonlinear resistors is positioned within said cylindrical housing excentrically of said cylindrical housing, and said shielding conductor extending from said electric conductor inclined relative to said stack and extending progressively radially further from said stack in a direction along said stack away from said electric conductor and with an orientation to impart in operation a uniform electric field profile to said nonlinear resistors.

2. An encapsulated lightning arrester according to claim 1, further comprising respective electrodes each disposed between a respective pair of adjacent nonlinear resistors and extending outwardly of said stack of nonlinear resistors.

3. An encapsulated lightning arrester according to claim 1, wherein: said cylindrical housing is an axially symmetrical circular cylindrical housing having an imaginary longitudinal axis of symmetry; said stack of nonlinear resistors is substantially straight and parallel to and eccentric to the imaginary longitudinal axis of symmetry of said cylindrical housing; and said shielding conductor has a substantially straight portion inclined to said stack of nonlinear resistors.

4. An encapsulated lightning arrester, comprising: a hollow cylindrical electrically conductive housing; an electric conductor extending into said hollow cylindrical housing and insulated from said hollow cylindrical housing; a plurality of stacked serially connected nonlinear resistors stacked in at least one stack within said hollow cylindrical housing, said stack of said serially connected nonlinear resistors having one end connected to said electric conductor and having another end connected to said hollow cylindrical housing for defining an electrically resistive path between said electric conductor and said housing; at least one shielding conductor comprised of an axial extension of said electric conductor within said housing and extending along a side of said stack of nonlinear resistors; and wherein said stack of nonlinear resistors is oriented within said hollow cylindrical housing with one higher potential side closer to said shielding conductor than another lower potential side closer to an inner side surface of said hollow cylindrical housing to impart in operation a uniform electric field profile to said nonlinear resistors.

5. An encapsulated lightning arrester according to claim 4, wherein: said shielding conductor has a diameter greater than a diameter of said electric conductor.

6. An encapsulated lightning arrester according to claim 4, wherein: said cylindrical housing is an axially symmetrical circular cylindrical housing having an imaginary longitudinal axis of symmetry; said electric conductor and said shielding conductor extending therefrom are substantially straight and lie substantially along the imaginary longitudinal axis of symmetry of said cylindrical housing; and said shielding conductor has a diameter greater than a diameter of said electric conductor.

7. An encapsulated lightning arrester according to claim 1, 2, 3, 4, 5 or 6, wherein said nonlinear resistors are comprised of zinc oxide.

* * * * *